(12) United States Patent
Gao

(10) Patent No.: US 11,500,804 B2
(45) Date of Patent: Nov. 15, 2022

(54) METHOD FOR TRANSMITTING CONTROL INSTRUCTION, TRANSMITTING DEVICE, AND RECEIVING DEVICE

(71) Applicant: SHENZHEN LENKENG TECHNOLOGY CO., LTD, Shenzhen (CN)

(72) Inventor: Binghai Gao, Shenzhen (CN)

(73) Assignee: SHENZHEN LENKENG TECHNOLOGY CO., LTD, Shenzhen (CN)

( * ) Notice: Subject to any disclaimer, the term of this patent is extended or adjusted under 35 U.S.C. 154(b) by 155 days.

(21) Appl. No.: 17/110,318

(22) Filed: Dec. 3, 2020

(65) Prior Publication Data
US 2021/0173802 A1 Jun. 10, 2021

(30) Foreign Application Priority Data
Dec. 4, 2019 (CN) .......................... 201911229094.9

(51) Int. Cl.
*G06F 13/38* (2006.01)
*G06F 13/42* (2006.01)

(52) U.S. Cl.
CPC ........ *G06F 13/382* (2013.01); *G06F 13/4286* (2013.01); *G06F 2213/0002* (2013.01); *G06F 2213/0042* (2013.01); *G06F 2213/3808* (2013.01)

(58) Field of Classification Search
CPC .............. G06F 13/382; G06F 13/4286; G06F 2213/0002; G06F 2213/0042; G06F 2213/3808
See application file for complete search history.

(56) References Cited

U.S. PATENT DOCUMENTS

| | | | | |
|---|---|---|---|---|
| 7,830,983 | B2 * | 11/2010 | Dibiaso | ............... H04L 27/2601 |
| | | | | 375/135 |
| 2010/0086017 | A1 * | 4/2010 | Shumarayev | ..... H04L 25/03019 |
| | | | | 375/232 |
| 2012/0167149 | A1 * | 6/2012 | Toba | ................... H04N 21/4305 |
| | | | | 725/85 |

FOREIGN PATENT DOCUMENTS

WO WO-2019001369 A1 * 1/2019 ............. G06F 13/40

* cited by examiner

*Primary Examiner* — Henry Tsai
*Assistant Examiner* — John B Roche
(74) *Attorney, Agent, or Firm* — Bayramoglu Law Offices LLC

(57) ABSTRACT

Provided are a method for transmitting a control instruction, a transmitting device and a receiving device. The method includes the follows. A first control instruction is obtained by a transmitting device. the first control instruction is encapsulated into a first protocol data stream. The first protocol data stream is superimposed, by the transmitting device through a first coupling network, on a second protocol data stream in the form of differential signal generated according to multimedia data to obtain a first signal, and the first signal is transmitted to a receiving device via a cable. The first signal is filtered by the receiving device to obtain a first protocol data stream, and the first protocol data stream is decapsulated to obtain a first signal. By adopting the disclosure, transmitting control instruction via the cable can realize controlling the target device connected to the receiving. The user experience is high.

18 Claims, 6 Drawing Sheets

METHOD FOR TRANSMITTING CONTROL INSTRUCTION, TRANSMITTING DEVICE, AND RECEIVING DEVICE

CROSS REFERENCE TO RELATED APPLICATION

The present application claims priority to Chinese Patent Application Serial No. 201911229094.9 on 4 Dec. 2019, the disclosures of both of which are herein by incorporated by reference.

TECHNICAL FIELD

The disclosure relates to the technical field of network communication, and particularly to a method for transmitting a control instruction, a transmitting device, and a receiving device.

BACKGROUND

With the advancement of society and the development of science and technology, especially the development of Internet of Things technology, the Internet of Things of various traditional devices has become a trend. At present, most of the communication lines between traditional devices are relatively complicated, and the cost of wiring is relatively high.

SUMMARY

Based on the above problems and the shortcomings of the prior art, the disclosure provides a method for transmitting control instruction, a transmitting device and a receiving device to offer an excellent solution for transmitting control instruction via a cable to achieve controlling a target device and further transmitting electrical signal to achieve power supply to electrical equipment while transmitting control instruction. The user experience is high.

In a first aspect, a method for transmitting control instruction is provided. The method for transmitting control instruction includes the following.

A first control instruction is obtained by the transmitting device via a first interface.

The first control instruction is encapsulated by the transmitting device through a communication protocol into a first protocol data stream.

The first protocol data stream is superimposed by the transmitting device through a first coupling network on a second protocol data stream, in the form of differential signal, generated according to multimedia data to obtain a first signal, and the first signal is transmitted, by the transmitting device, to a receiving device via the cable.

The first signal is filtered by the receiving device through a second coupling network to obtain a first target protocol data stream.

The first target protocol data stream is decapsulated by the receiving device to obtain a first target instruction, where the first target instruction is used to control a first target device connected to a second interface of the receiving device.

In a second aspect, another method for transmitting control instruction is provided. The method for transmitting control instruction includes the following.

A third control instruction is obtained by the receiving device via a third interface.

The third control instruction is encapsulated, by the receiving device through the communication protocol, into a third protocol data stream.

The third protocol data stream is superimposed by the receiving device through a third coupling network on a fourth protocol data stream, in the form of differential signal, to obtain a third signal, and the third signal is transmitted, by the receiving device, to the transmitting device via the cable.

The third signal is filtered by the transmitting device through a fourth coupling network to obtain a third target protocol data stream.

The third target protocol data stream is decapsulated by the transmitting device to obtain a third target instruction, where the third target instruction is used to control a second target device connected to a fourth interface of the transmitting device.

In a third aspect, a transmitting device is provided. The transmitting device includes: a first memory and a first processor coupled to the first memory. The first memory is configured to store application program instruction. The first processor is configured to invoke the application program instruction to execute as follows.

A first control instruction is obtained via a first interface.

The first control instruction is encapsulated through the communication protocol into the first protocol data stream.

The first protocol data stream is superimposed through the first coupling network on the second protocol data stream, in the form of the differential signal, generated according to multimedia data to obtain a first signal, and the first signal is transmitted to the receiving device via the cable.

In a fourth aspect, a receiving device is provided. The receiving device includes a second memory and a second processor connected to the second memory. The second memory is configured to store application program instruction. The second processor is configured to invoke the application program instruction to execute as follows.

A third control instruction is obtained via a third interface. the third control instruction is encapsulated into a third protocol data stream via a communication protocol. The third protocol data stream and a fourth protocol data stream in the form of differential signal are superimposed, through a third coupling network, to obtain a third signal. The third signal is transmitted to the transmitting device via a cable.

BRIEF DESCRIPTION OF THE DRAWINGS

In order to explain the technical solutions in implementations of the disclosure more clearly, the drawings used in the description of the implementations are briefly introduced below. Obviously, the drawings in the following description are some implementations of the disclosure. For ordinary technicians, other drawings can be obtained based on these drawings without paying creative work.

DETAILED DESCRIPTION

The technical solutions in the disclosure will be described clearly and completely in combination with the drawings in the disclosure. Obviously, the described implementations are part of the implementations of the disclosure, but are not all of the implementations.

In order to better clarify the process that the control instruction is transmitted to a receiving device via a twisted pair to control an output device (such as a projector) connected to a universal serial bus (USB) interface of the receiving device after the control instruction is obtained, by a transmitting device via a USB interface of the transmitting device, from a first control device (such as a laptop). a method for transmitting control instruction is provided.

Figure 1:
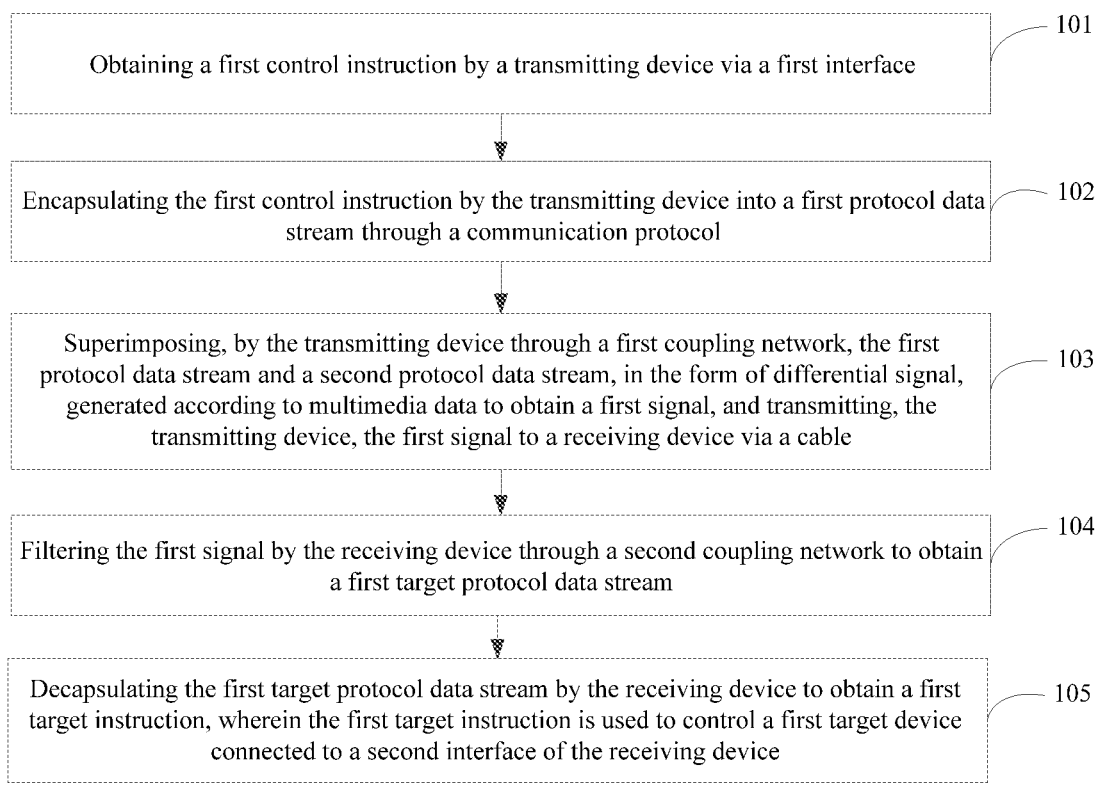
FIG. 1 is a schematic flowchart of a method for transmitting control instruction according to the disclosure.

FIG. 1 is a schematic flowchart of a method for transmitting control instruction according to the disclosure. As shown in FIG. 1, the method for transmitting control instruction may include, but is not limited to, the following.

At block 101, a first control instruction is obtain by a transmitting device via a first interface.

According to implementation of the disclosure, the first control instruction may be a program control instruction for controlling related equipment. It should be noted that the program control instruction may include, but is not limited to, transfer instruction (unconditional transfer and conditional transfer), program invoke instruction, and return instruction.

According to implementation of the disclosure, obtaining the first control instruction by the transmitting device via a first interface may include, but is not limited to, the following.

The first control instruction is obtained by the transmitting device from a first control device via the first USB interface of the transmitting device.

It should be noted that the first control instruction is obtained by the transmitting device from the first control device via the first USB interface of the transmitting device, which may specifically include, but is not limited to, the following.

It should be noted that the first control device is a laptop as an example.

Step 1, the first control instruction input from a user is received by the laptop.

Step 2, the first control instruction transmitted from the laptop is received by the transmitting device via the USB interface of the transmitting device. It should be noted that the laptop and the transmitting device can be connected via the USB interface of the transmitting device.

At block 102, the first control instruction is encapsulated by the transmitting device into a first protocol data stream through a communication protocol.

According to implementation of the disclosure, the first control instruction is encapsulated by the transmitting device into a first protocol data stream through a communication protocol, which may specifically include, but is not limited to, the following.

Method 1, the first control instruction received, via the USB interface on the conversion chip of the transmitting device, can be encapsulated, by the transmitting device based on the USB protocol, to obtain a first data, and the first data can be encapsulated, through the RS232 protocol, to obtain the first protocol data stream whose transmission rate is lower than with a preset threshold.

It should be noted that the value range of the preset threshold is between tens of kbps and hundreds of kbps.

The first control instruction received, via the USB interface on the conversion chip of the transmitting device, can be encapsulated, by the transmitting device based on the USB protocol, to obtain the first data.

Specifically, a front of the first control instruction can be added with a first protocol head and a end of the first control instruction can be added with a first protocol tail respectively by the transmitting device based on the USB protocol to obtain the first data. Among them, the first protocol head or the first protocol tail may include, but is not limited to, necessary control information such as synchronization information, address information, or error control information.

The first data is encapsulated through RS232 protocol to obtain the first protocol data stream whose transmission rate is lower than the preset threshold. Specifically, a second protocol head is added to the front of the first control data and a second protocol tail is added to the end of the first control data by the transmitting device through the RS232 protocol to obtain the first protocol data stream.

Method 2, the first control instruction received via the USB interface on the conversion chip of the transmitting device can be encapsulated, by the transmitting device based on the USB protocol, to obtain the first data, and the first data is encapsulated through the universal asynchronous receiver/transmitter (UART) protocol to obtain the first protocol data stream with a transmission rate lower than the preset threshold.

At block 103, the first protocol data stream is superimposed, by the transmitting device through a first coupling network, on the second protocol data stream, in the form of differential signal, generated according to multimedia data to obtain a first signal, and the first signal is transmitted, by the transmitting device, to the receiving device via a cable.

According to implementations of the disclosure, before the first protocol data stream is superimposed, by the transmitting device through a first coupling network, on the second protocol data stream, in the form of differential signal, generated according to multimedia data, the following operation steps are further included.

Step 1, the transmitting device obtains multimedia data from the video source device via a high definition multimedia interface (HDMI).

Specifically, the video source device may include, but is not limited to, DVD, set-top box and other devices.

Step 2, the transmitting device compresses the multimedia data with a compression algorithm.

The compression algorithm may include, but is not limited to, display stream compression standard (DSC) algorithm, color space converter (CSC), JPEG2000 encoding algorithm, or Huffman encoding algorithm.

It will take an example in the following that the DSC algorithm is used to encode the multimedia data to obtain code stream data for describing the compression of the multimedia data in detail.

The multimedia data being a video is taken as an example, the transmitting encodes the video with the DSC algorithm, which can specifically include, but is not limited to, the following.

In process 1, each frame of image in the video is divided into a number of non-overlapping square strips as independent coding units, where the coding is performed in a row scanning mode, and an A1×1 pixel group composed of connected A1 pixels can be used as a processing unit, optionally, A1 can be 3, 4, or 5, which is not limited herein.

In process 2, the transmitting device uses the DSC algorithm to predict the current pixel based on the intra-differential pulse code modulation (DPCM) method. The prediction residual value is quantized and reconstructed by using a simple integer power quantization of 2. The quantized residual signal is subjected to entropy coding (such as Variable Length Coding (VLC)), where the entropy coding operates on a 3×1 pixel group, and each component can generate an entropy-coded sub-code stream. These sub-code streams (that is, each sub-code stream may be a compressed data stream formed by each component) are packed, stream-multiplexed, and outputted.

It should be noted that the DSC algorithm can support the following, but is not limited to, the following prediction modes: Modified Median Adaptive Prediction (MMAP), Block Prediction (BP) and Mid-Point Prediction (MPP).

In summary, the embodiments of the present disclosure, the transmitting device can encode multimedia data with the DSC compression algorithm to obtain code stream data, and can further encode, according to any two or more methods mentioned above, the multimedia data to obtain code stream data.

Specifically, the multimedia data can be compressed with DSC algorithm and CSC algorithm to obtain code stream data jointly.

The multimedia data can further be compressed with the CSC and JPEG2000 encoding algorithms to obtain code stream data jointly.

Step 3, a compressed data (code stream data) can be encapsulated by the transmitting device through the differential signal technology to generate a second protocol data stream in the form of differential signaling (DS).

According to the embodiment of the disclosure, the first protocol data stream is superimposed, by the transmitting device through a first coupling network, on the second protocol data stream, in the form of differential signal, generated according to multimedia data to obtain a first signal, which may specifically include, but is not limited to, the following methods.

Method 1, the first protocol data stream is superimposed, by the transmitting device through the first coupling network, on the second protocol data stream, in the form of transition-minimized differential signaling (TMDS), generated according to the multimedia data to obtain the first signal.

The process that the first protocol data stream is superimposed, by the transmitting device through the first coupling network, on the second protocol data stream, in the form of a TMDS signal, to obtain the first signal will be briefly described below with reference to FIGS. 2-3.

Figure 2:
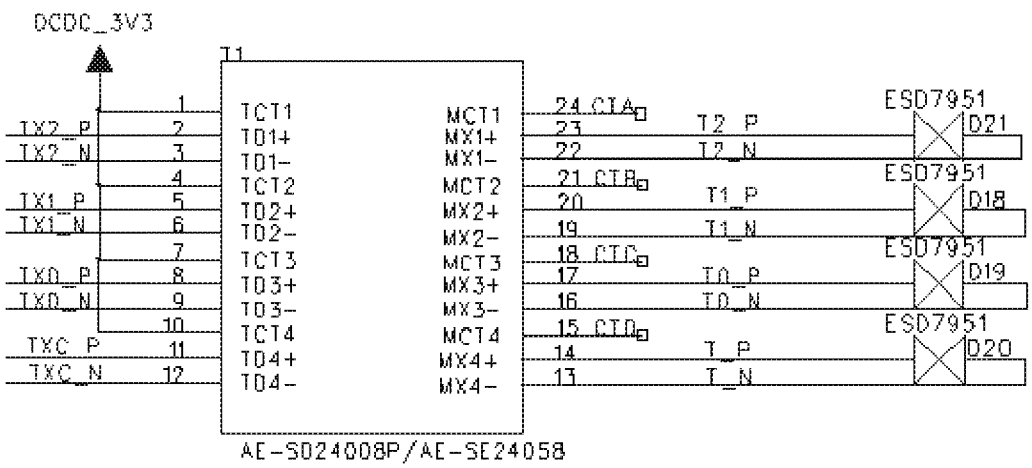
FIG. 2 is a schematic structural diagram of a coupling network according to the disclosure.

FIG. 2 exemplarily shows a schematic structural diagram of the first coupling network.

As shown in FIG. 2, the first coupling network may include, but is not limited to, a network transformer T1.

It should be noted that the second protocol data stream in the form of a TMDS signal is input to the network transformer T1 of the transmitting device via TXD_P, TXD_N, etc. ports, and the first protocol data stream is input to the network transformer T1 of the transmitting device via the CTC port. Then, after the first protocol data stream is superimposed, by the transmitting device through the network transformer T1, on the second protocol data stream, in the form of the TMDS signal to obtain a first signal. The first signal is output, by the transmitting device, to the network port via T0_P and T0_N, and finally the first signal is transmitted to the receiving device via the twisted pair connected to the network port.

It should be noted that the network transformer T1 of the transmitting device receives the second protocol data stream via TX2_P, TX2_N, TX1_P, TX1_N, TX1_P, TX1_N, and the network transformer T1 can obtain electrical signal via the CTA port and obtain Ground signal via the CTB port.

Figure 3:
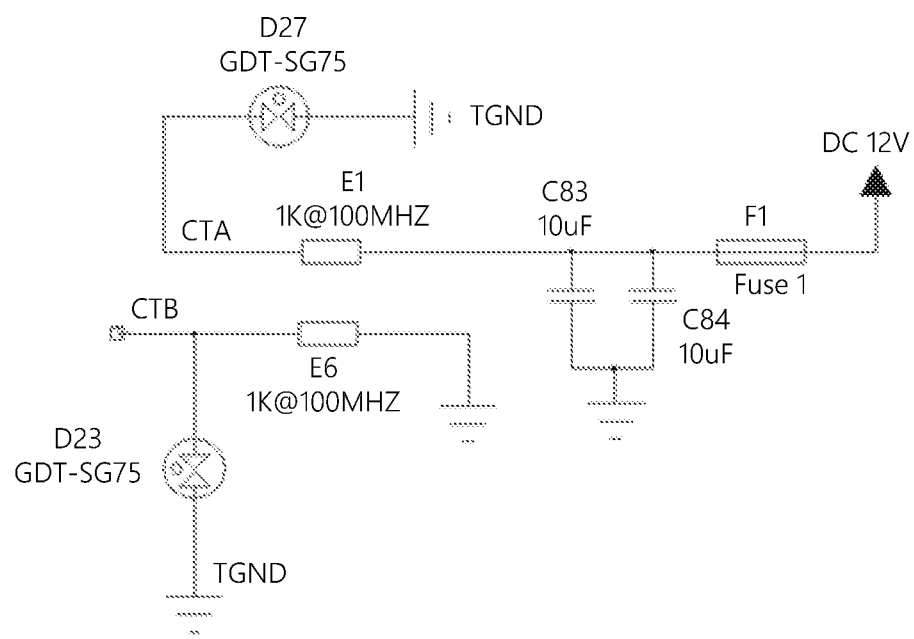
FIG. 3 is a schematic structural diagram of the connection of interfaces of another coupling network according to the disclosure.

As shown in FIG. 3, the network transformer T1 of the transmitting device obtains electrical signals via the CTA port and Ground signal via the CTB port.

The process that the first protocol data stream is superimposed, by the transmitting device, on the second protocol data stream, in the form of differential signal, to obtain the first signal will be described below with reference to FIGS. 4-6.

Figure 4:
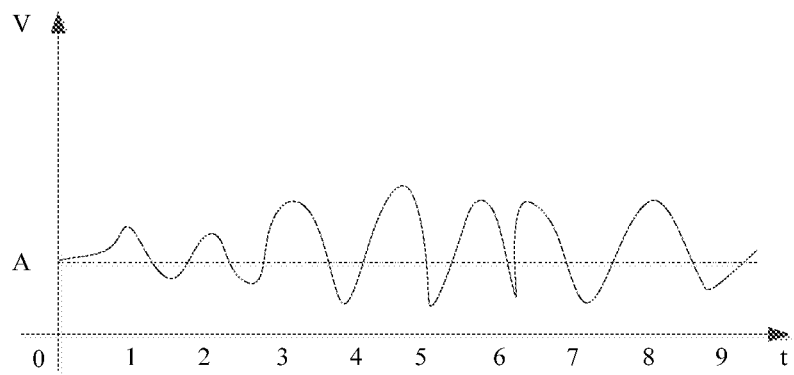
FIG. 4 is a schematic structural diagram of a first protocol data stream according to the disclosure.

FIG. 4 exemplarily shows a schematic structural diagram of a first protocol data stream. As shown in FIG. 4, the voltage (V) of the first protocol data stream changes with time t, where A is a constant. It should be noted that the vertical axis represents voltage (V), and the horizontal axis represents time (t).

Figure 5:
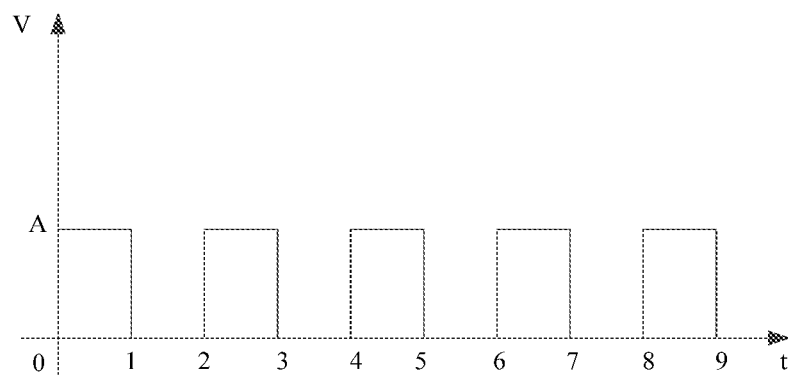
FIG. 5 is a schematic structural diagram of a second protocol data stream in the form of differential signal according to the disclosure.

FIG. 5 exemplarily shows a schematic structural diagram of a second protocol data stream in the form of differential signal. As shown in FIG. 5, the voltage (V) of the second protocol data stream, in the form of differential signal, changes with time t, where B is a constant. It should be noted that the vertical axis represents voltage (V), and the horizontal axis represents time (t).

Figure 6:
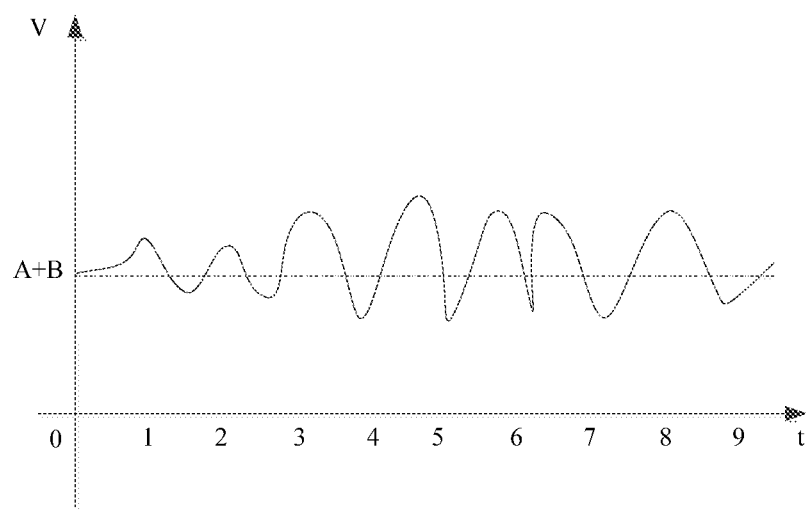
FIG. 6 is a schematic structural diagram of a superimposed signal according to the disclosure.

FIG. 6 exemplarily shows a schematic structural diagram of a superimposed signal. As shown in FIG. 6, the superimposed signal shown in the FIG. 6 is a first signal, after the first protocol data stream shown in FIG. 4 is superimposed on the second protocol in the form of differential signal shown in FIG. 5 to obtain the first signal, where A and B are constants, and it should be noted that the vertical axis represents voltage (V), and the horizontal axis represents time (t).

Method 2, the first protocol data stream is superimposed, by the transmitting device through the first coupling network, on the second protocol data stream, in the form of low voltage differential signaling (LVDS), generated according to the multimedia data to obtain the first signal.

The first signal to the receiving device is transmitted by the transmitting device via the cable, which may specifically include, but is not limited to, the following.

The transmitting device may transmit the first signal to the receiving device via twisted pair such as Cat5e, Cat6, Cat6a or Cat7.

Specifically, the transmitting device may transmit the first signal via a target pair of twisted pair among the four pairs of twisted pair.

It should be noted that before the transmitting device transmits the first signal to the receiving device via the cable, the transmitting device can also superimpose the electrical signal and the second protocol data stream in the form of differential signal to obtain a first preset signal. The transmitting device can transmit the first preset signal to the receiving device via the other twisted pair of the above four twisted pairs, where the other twisted pair is any one of the above four twisted pairs except for the specific pair of twisted pairs.

In summary, the transmitting device can transmit the first signal containing the first control instruction information to the receiving device via the cable. At the same time, transmitting the electrical signal to the receiving device can realize the power supply to the receiving device and the electrical equipment connected to the receiving device (such as an output device. The user experience is high.

At block 104, the receiving device filters the first signal through the second coupling network to obtain the first target protocol data stream.

According to the embodiment of the disclosure, the receiving device filters the first signal through the second coupling network to obtain the first target protocol data stream, which may specifically include, but is not limited to, the following.

Situation 1, if the transmitting device superimposes the first protocol data stream and the second protocol data stream, in the form of TMDS, generated according to multimedia data through the first coupling network to obtain the first signal, the receiving device filters the first signal through the second coupling network to obtain a first target protocol data stream including control instruction information and a target protocol data stream, in the form of TMDS signal, including the multimedia data.

The process of filtering the first signal through the second coupling network to obtain the first target protocol data stream including the control instruction and the target protocol data stream, in the form of the TMDS signal, including multimedia data will be briefly described below with reference to FIG. 7.

Figure 7:
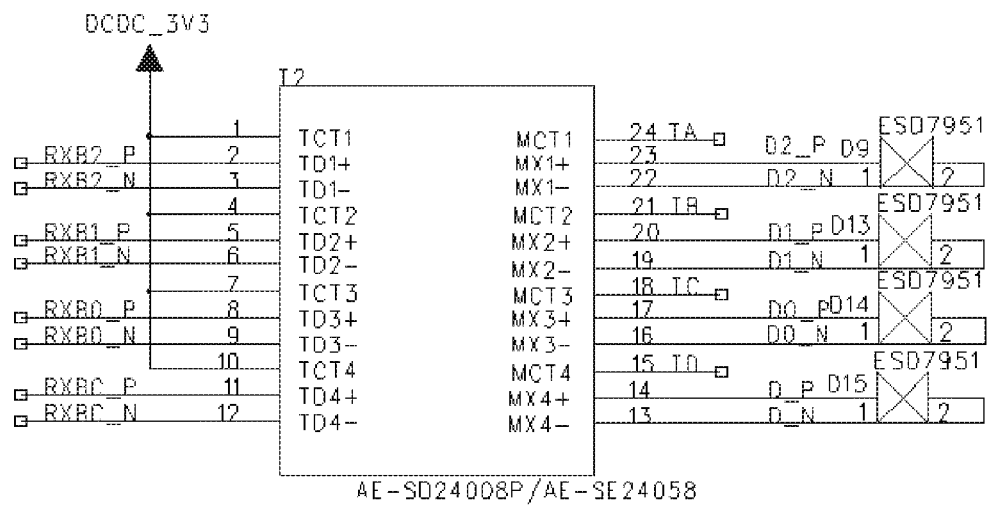
FIG. 7 is a schematic structural diagram of another coupling network according to the disclosure.

FIG. 7 exemplarily shows a schematic structural diagram of a second coupling network.

As shown in FIG. 7, the second coupling network may include, but is not limited to, a network transformer T2.

It should be noted that the first signal is filtered through the network transformer T2 to obtain the first target protocol data stream including the control instruction after the receiving device receives the first signal transmitted from the transmitting device via the D0_P and D0_N ports of the network transformer T2.

The target protocol data stream, in the form of TMDS signal, including the multimedia data is output via the RXR0_P port and RXR0_N port.

Situation 2, if the transmitting device superimposes the first protocol data stream and the second protocol data stream, in the form of LVDS, generated according to the multimedia data through the first coupling network to obtain the first signal, the receiving device filters the first signal through the second coupling network to obtain the first target protocol data stream including the control instruction and the target protocol data stream, in the form of LVDS, including the multimedia data.

At block 105, the first target protocol data stream is decapsulated by the receiving device to obtain a first target instruction.

According to the embodiment of the disclosure, the first target instruction is used to control the first target device connected to the second interface of the receiving device.

It should be noted that the first target protocol data stream is decapsulated by the receiving device to obtain the first target instruction, which may specifically include the following scenarios.

Scenario 1, if the transmitting device encapsulates the first control instruction through the USB protocol to obtain a first data, and encapsulates the first data through the RS232 protocol to obtain the first protocol data stream whose transmission rate is lower than the preset threshold, the receiving device decapsulates the first target protocol data stream through the RS232 protocol and the USB protocol to obtain the first target instruction.

Figure 8:
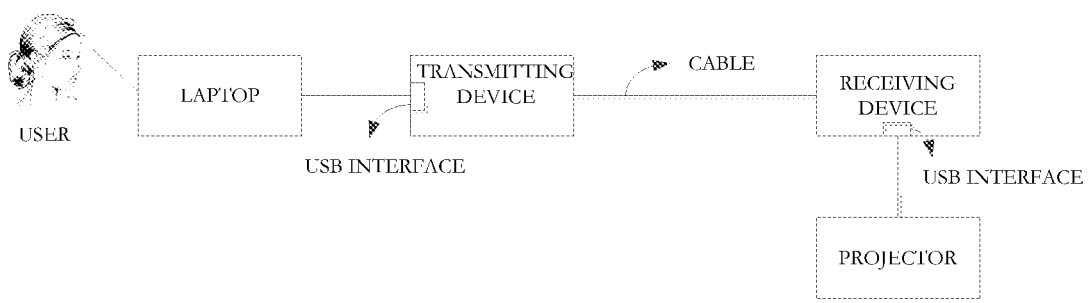
FIG. 8 is a schematic structural diagram of an application scenario according to the disclosure.

The following describes the content of scenario 1 with reference to FIG. 8.

As shown in FIG. 8, the scenario 1 shown in FIG. 8 may include, but is not limited to, the following operation steps.

Operation step 1, the laptop can receive the first control instruction input from the user (such as the instruction line input from the user).

Operation step 2, the transmitting device can obtain the first control instruction from the laptop via the USB interface on the conversion chip of the transmitting device.

Operation step 3, the transmitting device can encapsulate the first control instruction received via the USB interface on the conversion chip of the transmitting device based on the USB protocol to obtain the first data, encapsulate the first data through the RS232 protocol to obtain the first protocol data stream whose transmission rate is lower than the preset threshold, and output the first protocol data stream to the first coupling network via the RS232 interface on the conversion chip of the transmitting device.

Operation step 4, the transmitting device superimposes the first protocol data stream and the second protocol data stream, in the form of differential signal, generated according the multimedia data through the first coupling network to obtain the first signal, and transmit the first signal via twisted pair such as Cat5e and Cat6 to the receiving device.

Operation step 5, the receiving device filters the first signal through the second coupling network to obtain the first target protocol data stream including the control instruction.

Operation step 6, the receiving device decapsulates the first target protocol data stream to obtain the first target instruction.

It should be noted that if the transmitting device can encapsulate the first control instruction received, via the USB interface, on the conversion chip of the transmitting device based on the USB protocol to obtain the first data, and encapsulate the first data through the RS232 protocol to obtain a first protocol data stream with a transmission rate lower than a preset threshold, the receiving device can decapsulate the first protocol data stream received, via the RS232 interface, on the conversion chip of the receiving device through the RS232 protocol and the USB protocol to obtain the first target instruction, and transmit the first target instruction to the output devices, such as projectors, via the USB interface of the receiving device to control the projector (for example, start or shut down the projector).

Scenario 2, if the transmitting device encapsulates the first control instruction through the USB protocol to obtain the first data, and encapsulates the first data through the UART protocol to obtain the first protocol data stream whose transmission rate is lower than the preset threshold, the receiving device decapsulates the first target protocol data stream through the UART protocol and the USB protocol to obtain the first target instruction.

It should be noted that FIGS. 2-8 are only used to explain the implementations of the disclosure, and should not limit the disclosure.

The implementations of the disclosure provide a method for transmitting control instruction. The transmitting device obtains the first control instruction via the first interface. the transmitting device encapsulates the first control instruction into the first protocol data stream through the communication protocol. The transmitting device superimposes the first protocol data stream and the second protocol data stream, in the form of differential signal, generated according to multimedia data through the first coupling network to obtain the first signal, and transmits the first signal to the receiving device via the cable. The receiving device filters the first signal through the second coupling network to obtain the first target protocol data stream. The receiving device decapsulates the first target protocol data stream to obtain the first target instruction, where the first target protocol data stream is used to control the first target device connected to the second interface of the receiving device.

In summary, the transmission of control instruction between the transmitting device and the receiving device via the cable can realize controlling a target equipment coupled to the receiving device. While transmitting the control instructions, the transmitting device can also transmit electrical signals to the receiving device, which can realize power supply to the receiving device and the electrical equipment connected to the receiving device. The user experience is high.

In order to better clarify the process that after receiving the control instructions from the second control device (such as keyboard, mouse, monitor or laptop) via the interface of the receiving device, the receiving device transmits the above control instructions to the transmitting device to control the video source equipment (such as a camera) connected to the transmitting device. the implementation of the disclosure provides another method for transmitting control instruction.

Figure 9:
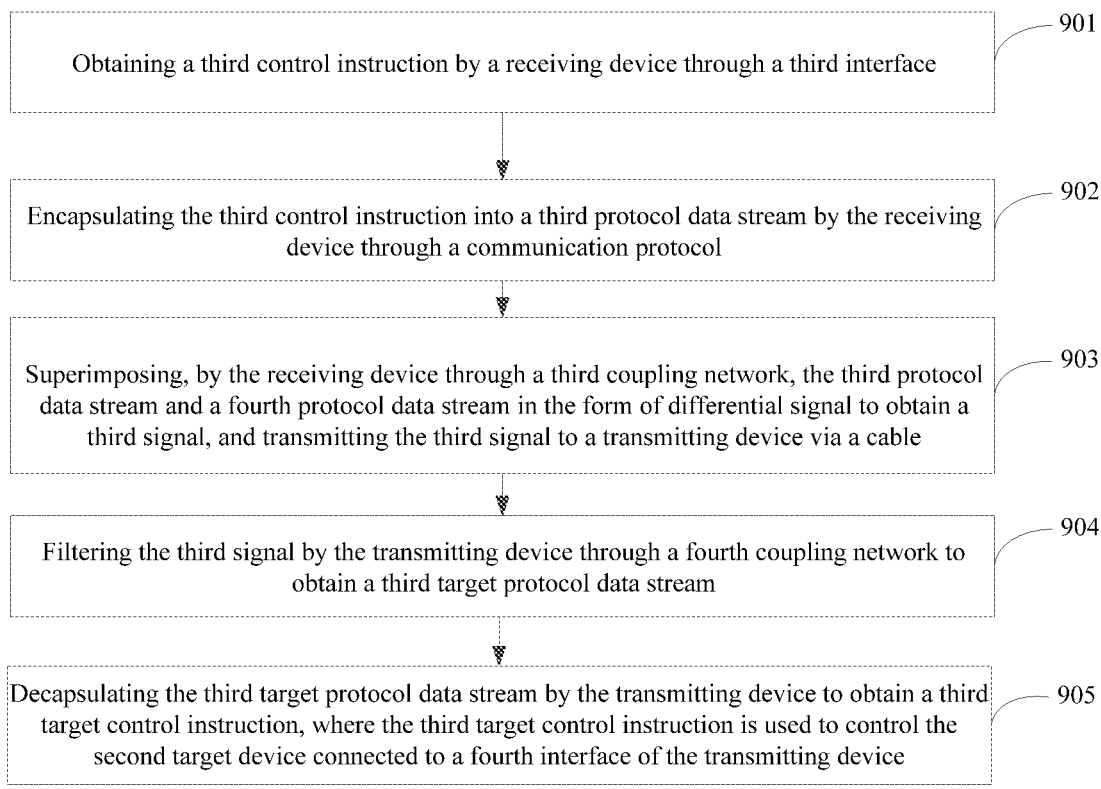
FIG. 9 is a schematic flowchart of another method for transmitting control instruction according to the disclosure.

FIG. 9 is a schematic flowchart of another method for transmitting control instruction provided by the disclosure. As shown in FIG. 9, the method may at least include the following.

At block 901, the receiving device obtains the third control instruction via the third interface.

According to the implementation of the disclosure, the third control instruction may be a control program for controlling a related equipment.

According to the implementation of the disclosure, the receiving device obtains the third control instruction via the third interface, which may include, but is not limited to, the following.

The receiving device obtains the third control instruction from the second control device via the third USB interface of the receiving device.

It should be noted that the receiving device obtains the third control instruction from the second control device via the third USB interface of the receiving device as follows.

Here, taking the second control device as a laptop as an example.

Step 1, the laptop receives the third control instruction input from the user.

Step 2, the receiving device receives the third control instruction input from the laptop via the USB interface of the receiving device. It should be noted that the laptop and the receiving device can be connected via the USB interface of the receiving device.

At block 902, the receiving device encapsulates the third control instruction into a third protocol data stream through the communication protocol.

According to the implementation of the disclosure, the receiving device encapsulates the third control instruction into a third protocol data stream through a communication protocol, which may specifically include, but is not limited to, the following methods.

Method 1, the receiving device can encapsulate the third control instruction received via the USB interface on the conversion chip of the receiving device based on the USB protocol to obtain the third data, and encapsulate the third data through the RS232 protocol to obtain the third protocol data stream whose transmission rate is lower than the preset threshold.

The receiving device can encapsulate, based on the USB protocol, the third control instruction received via the USB interface on the conversion chip of the receiving device to obtain the third data. Specifically, the receiving device can add, based on the USB protocol, a third protocol head to the front the third control instruction and a third protocol tail to the end of the third control instruction to obtain the third data.

The third data is encapsulated, by the receiving device through the RS232 protocol, to obtain the third protocol data stream whose transmission rate is lower than the preset threshold.

Specifically, the receiving device add, based on the RS232 protocol, a fourth protocol header to the front of the third data and a fourth specific protocol tail to the end of the third data to obtain the third protocol data stream.

Method 2, the receiving device can encapsulate, based on the USB protocol, the third control command received via the USB interface on the conversion chip of the receiving device to obtain the third data, and encapsulate the third data through the URAT protocol to obtain the third protocol data stream whose transmission rate is lower than the preset threshold.

At block 903, the receiving device superimposes, through a third coupling network, the third protocol data stream and the fourth protocol data stream in the form of differential signal to obtain a third signal, and transmits the third signal to the transmitting device via a cable.

According to the implementation of the disclosure, before the receiving device superimposes, through the third coupling network, the third protocol data stream and the fourth protocol data stream in the form of differential signal, the method further includes the following.

Step 1, the receiving device receives the target superimposed signal transmitted by the transmitting device via the cable, and the target superimposed signal includes a fourth protocol data stream, in the form of differential signal, generated according to the multimedia data.

Step 2, the receiving device filters the above-mentioned target superimposed signal to obtain a fourth protocol data stream in the form of differential signal.

It should be noted that the receiving device superimposes, through the third coupling network, the third protocol data stream with the fourth protocol data stream in the form of differential signal to obtain the third signal, which may specifically include the following.

Method 1, the receiving device superimposes, through a third coupling network, the third protocol data stream and the fourth protocol data stream in the form of TMDS to obtain a third signal.

Method 2, the receiving device superimposes, through a third coupling network, the third protocol data stream and the fourth protocol data stream in the form of LVDS to obtain a third signal.

The receiving device transmits the third signal to the transmitting device via the cable, which may specifically include, but is not limited to, the following.

the receiving device transmits the third signal to the transmitting device via twisted pair such as Cat5e, Cat6, Cat6a or Cat7.

Specifically, the receiving device may transmit the third signal via a pair of other twisted pairs among the four twisted pairs. According to the implementation of the disclosure, the pair of other twisted pairs used to transmit the third signal and the pair of twisted pairs used to transmit the target superimposed signal are not the same pair of twisted pair.

It should be noted that the receiving device may include, but is not limited to, a first receiving device and a second receiving device.

The receiving device superimposes, through a third coupling network, the third protocol data stream and the fourth protocol data stream in the form of differential signal to obtain a third signal, and transmits the third signal to the transmitting device via a cable, which may include, but is not limited to, the following.

The second receiving device superimposes, through the third coupling network, the third protocol data stream and the fourth protocol data stream, in the form of differential signals, to obtain the third signal, and forwards the third signal to the first receiving device via the cable, and transmits the third signal, by the first receiving device, to the transmitting device.

At block 904, the transmitting device filters the third signal through the fourth coupling network to obtain the third target protocol data stream.

According to the implementation of the disclosure, the transmitting device filters the third signal through the fourth coupling network to obtain the third target protocol data stream, which may specifically include, but is not limited to, the following.

Situation 1, if the receiving device superimposes, through the third coupling network, the third protocol data stream with the fourth protocol data stream in the form of TMDS to obtain the third signal, the transmitting device filters the third signal through the fourth coupling network to obtain the third target protocol data stream including the control instruction and the target protocol data stream, in the form of TMDS, including multimedia data.

Situation 2, if the receiving device superimposes, through the third coupling network, the third protocol data stream with the fourth protocol data stream, in the form of LVDS, to obtain the third signal, the transmitting device filters, through the fourth coupling network, the third signal to obtain the third target protocol data stream associated with the control instruction and the target protocol data stream, in the form of LVDS, associated with the multimedia data.

At block 905, the transmitting device decapsulates the third target protocol data stream to obtain a third target control instruction.

According to the implementation of the disclosure, the third target control instruction is used to control the second target device connected to the fourth interface of the transmitting device.

It should be noted that the transmitting device decapsulates the third target protocol data stream to obtain a third target instruction, which may specifically include the following scenarios.

Scenario 1, if the receiving device encapsulates the third control command through the USB protocol to obtain third data, and encapsulates the third data through the RS232 protocol to obtain a third protocol data stream with a transmission rate lower than a preset threshold, the transmitting device decapsulates, through the RS232 protocol and the USB protocol, the third target protocol data stream to obtain the third target instruction.

The content of scenario 1 is described in the following with reference to FIG. 10.

Figure 10:
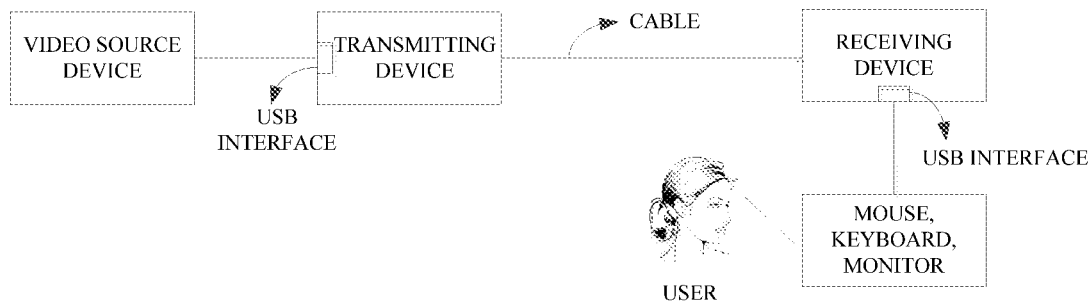
FIG. 10 is a schematic structural diagram of another application scenario according to the disclosure.

As shown in FIG. 10, scenario 1 shown in FIG. 10 may include, but is not limited to, the following.

Operation step 1, input devices such as mouse and keyboard can receive the third control instruction input from the user (such as the command line input from the user).

Operation step 2, the receiving device can receive the third control instruction from the laptop via the USB interface on the conversion chip of the receiving device.

Operation step 3, the receiving device can encapsulate, based on the USB protocol, the third control instruction received via the USB interface on the conversion chip of the receiving device to obtain the third data, encapsulate the third data through the RS232 protocol to obtain the third protocol data stream whose transmission rate is lower than the preset threshold, and output the third protocol data stream to the third coupling network via the RS232 interface on the conversion chip of the receiving device.

Operation step 4, the receiving device superimposes, through the third coupling network, the third protocol data stream with the fourth protocol data stream in the form of differential signal to obtain the third signal, and transmits the third signal via the twisted pair such as Cat5e or Cat6.

Operation step 5, the transmitting device filters the third signal through the fourth coupling network to obtain the third target protocol data stream.

Operation step 6, the transmitting device decapsulates the third target protocol data stream to obtain a third target control instruction.

It should be noted that if the receiving device can encapsulate, based on the USB protocol, the third control instruction received via the USB interface on the conversion chip of the receiving device to obtain the third data, and encapsulate, through the RS232 protocol, the obtained third data to obtain a third protocol data stream with a transmission rate lower than a preset threshold, the transmitting device can receive the third protocol data stream via the RS232 interface on the conversion chip of the transmitting device, decapsulate the third protocol data stream, through the RS232 protocol and the USB protocol, to obtain the third target instruction, and transmit the third target control instructions to the video source device via the USB interface of the receiving device to control the video source device (such as rotating the camera, starting or shutting down the DVD and set-top box connected to the USB interface of the transmitting device).

Figure 11:
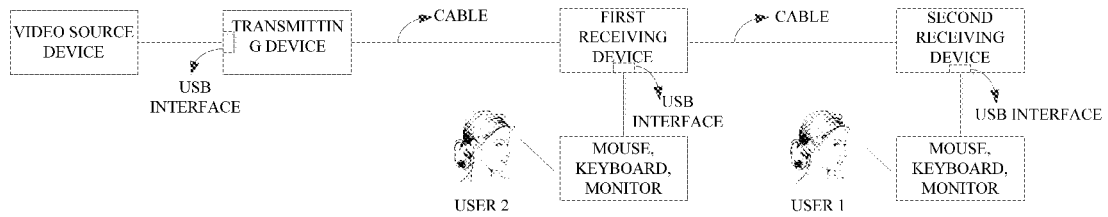
FIG. 11 is a schematic structural diagram of another application scenario according to the disclosure.

Scenario 1 can also be described below with reference to FIG. 11. As shown in FIG. 11, taking the receiving device including the first receiving device and the second receiving device as an example, the scenario 1 shown in FIG. 11 may include, but is not limited to, the following.

Operation step 1, input devices such as mouse and keyboard can receive the third control instruction input from the user (such as the command line input from the user).

Operation step 2, the second receiving device can receive a third control instruction from the laptop via the USB interface on the conversion chip of the receiving device.

Operation step 3, the second receiving device can encapsulate the third control instruction received via the USB interface on the conversion chip of the receiving device based on the USB protocol to obtain the third data, and encapsulate the third data through the RS232 protocol to obtain a third protocol data stream with a transmission rate lower than the preset threshold, and output the third protocol data stream to the third coupling network via the RS232 interface on the conversion chip of the receiving device.

Operation step 4, the second receiving device superimposes, through the third coupling network, the third protocol data stream and the fourth protocol data stream in the form of differential signal to obtain the third signal, and transmits, via twisted pair such as Cat5e or Cat6, the third signal to the first receiving device.

Operation step 5, the first receiving device forwards the third signal to the transmitting device via twisted pair such as Cat5e or Cat6.

Operation step 6, the transmitting device filters the third signal through the fourth coupling network to obtain the third target protocol data stream.

Operation step 7: The transmitting device decapsulates the third target protocol data stream to obtain a third target control instruction. Scenario 2, if the receiving device encapsulates the third control command through the USB protocol to obtain third data, and encapsulates the third data through the UART protocol to obtain a third protocol data stream with a transmission rate lower than a preset threshold, the transmitting device decapsulates the third target protocol data stream through the UART protocol and the USB protocol to obtain the third target instruction.

It should be noted that FIGS. 10-11 are only used to explain the implementations of the disclosure, and should not limit the disclosure.

It should be noted that definitions and descriptions not described in the method implementation described in FIG. 9, please refer to the method implementation described in FIG. 1.

Figure 12:
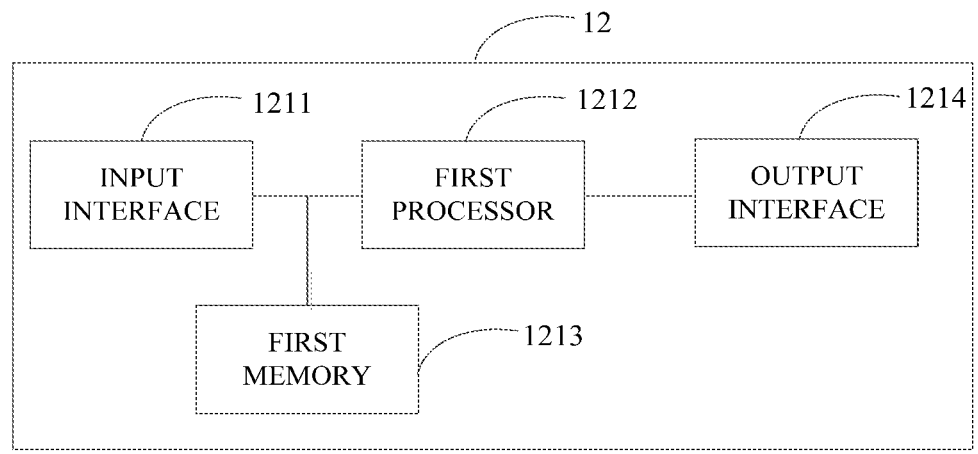
FIG. 12 is a schematic structural diagram of a transmitting device according to the disclosure.

The disclosure provides a transmitting device, and FIG. 12 is a schematic structural diagram of the transmitting device provided in the disclosure. According to the implementation of the disclosure, the transmitting device in FIG. 12 may be the transmitting device described in FIG. 1.

Specifically, as shown in FIG. 12, the transmitting device 12 may include, but is not limited to, an input port 1211, a first processor 1212, a first memory 1213, and an output port 1214. Among them, the input port 1211, the first processor 1212, the first memory 1213, and the output port 1214 may communicate with each other via one or more communication buses.

It should be noted that the first memory 1213 is coupled with the first processor 1212, and the first memory 1213 may be used to store the control instructions received by the device 12.

The input port 1211 may include the first USB interface of the transmitting device described in the method implementation in FIG. 1.

It should be noted that the input port 1211 can be configured to obtain control instructions from an input device (such as a first control device or a second control device).

The output port 1214 can be configured to output the superimposed signal to other devices.

When the transmitting device 12 in FIG. 12 is the transmitting device described in FIG. 1, the transmitting device 12 obtains the first control instruction from the input device via the input port 121. the first processor 1212 is configured to encapsulate the first control instruction into a first protocol data stream through the communication protocol. The first protocol data stream and the second protocol data stream in the form of the differential signal generated according to multimedia data are superimposed through the first coupling network to obtain the first signal. The first signal is transmitted, via the output port 1214 and the cable, to the receiving device described in FIG. 1. The first processor 1212 configured to encapsulate the first control instruction into the first protocol data stream through a communication protocol is configured to:

Encapsulate, based on a universal serial bus (USB) protocol, the first control instruction received via USB interface on the conversion chip of the transmitting device 12 to obtain the first data, and encapsulate the first data through the RS232 protocol to obtain a first protocol data stream whose transmission rate is lower than a preset threshold.

The first processor 1212 can be further configured to filter third signal transmitted by the receiving device through the fourth coupling network to obtain the third target protocol data stream;

decapsulate the third target protocol data stream to obtain a third target control instruction, where the third target control instruction is used to control a second target device connected to the fourth interface of the transmitting device 12.

It should be understood that the first memory 1213 can be configured to store control instructions obtained from an input device connected to the transmitting device 12, and further store a program for processing the control instructions.

It should be understood that the device 12 is only an example according to the implementation of the disclosure, and the transmitting device 12 may have more or fewer components than those shown, may combine two or more components, or may have different configurations of components.

It is understood that for the specific implementation of the functional components included in the device 12 described in FIG. 12, reference may be made to the method implementations described in FIG. 1 and FIG. 9, and details are not described herein again.

Figure 13:
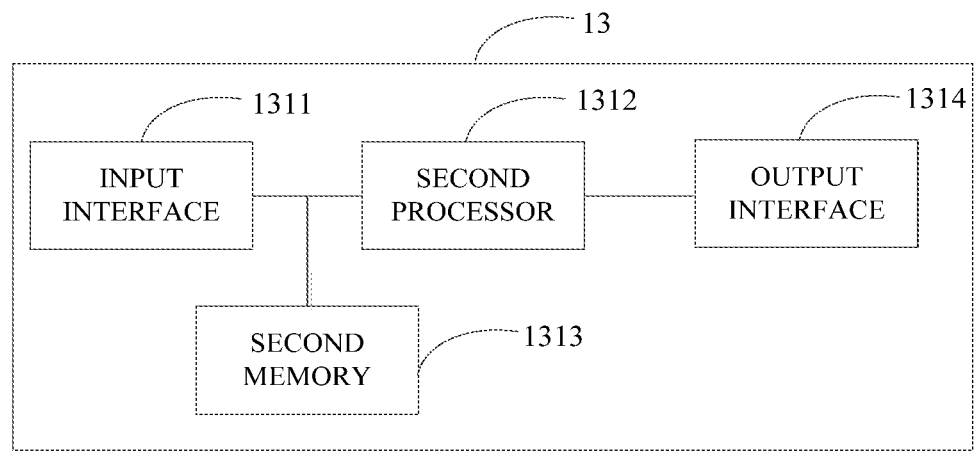
FIG. 13 is a schematic structural diagram of a receiving device according to the disclosure.

The disclosure provides a receiving device, and FIG. 13 is a schematic structural diagram of the receiving device according to the disclosure. According to the embodiment of the disclosure, the receiving device 13 in FIG. 13 may be the receiving device described in FIG. 1. As shown in FIG. 13, the receiving device 13 may include, but is not limited to, an input port 1311, a second processor 1312, a second memory 1313 and an output port 1314. Among them, the input port 1311, the second processor 1312, the second memory 1313, and the output port 1314 may communicate with each other via one or more communication buses.

It should be noted that the second memory 1313 is coupled with the second processor 1312, and the second memory 1313 can be configured to store the control instructions received by the device 13.

The input port 1311 may include a second USB interface of the receiving device described in the method embodiment in FIG. 1.

When the receiving device in FIG. 13 is the receiving device described in FIG. 1, the receiving device 13 receives the first signal transmitted by the transmitting device in FIG.

1 via the input port 1311. The second processor 1312 is configured to filter the first signal through the second coupling network to obtain the first target protocol data stream, decapsulate the first target protocol data stream to obtain a first target instruction, where the first target instruction is used to control the first target device connected to the receiving device in FIG. 1 (such as controlling the projector to start or shut down).

The second processor 1312 can be further configured to:

decapsulate, through the RS232 protocol, the first protocol data stream received via the RS232 interface of the conversion chip of the receiving device 13 to obtain the first data, and decapsulate the first data through the USB protocol to obtain the first target instruction.

The USB interface of the receiving device 13 is configured to output the first target control instruction to an output device such as a projector to control the output device (for example, start or shut down the projector).

The second processor 1312 can be configured to:

obtain a third control instruction via a third interface;

encapsulate the third control instruction into a third protocol data stream through a communication protocol; and superimpose the third protocol data stream and a fourth protocol data stream in the form of differential signal through a third coupling network to obtain a third signal, and transmit the third signal to the transmitting device via a cable.

The second processor 1312 can be further configured to:

before superposing the third protocol data stream and the fourth protocol data stream, in the differential signal format, through the third coupling network, receive a target superimposed signal transmitted by the transmitting device;

filter the target superimposed signal to obtain a fourth protocol data stream in the form of differential signal.

When the receiving device 13 includes a first receiving device and a second receiving device, the second receiving device superimposes, through a third coupling network, the third protocol data stream and the fourth protocol data stream, in the form of differential signal, to obtain a third signal, and forwards the third signal to the first receiving device via a cable and transmits, by the first receiving device, the third signal to the transmitting device.

It should be understood that the first memory 13 can be configured to store control instructions obtained from an input device connected to the receiving device 13, and can also store a program for processing the control instruction.

It should be understood that the receiving device 13 is only an example provided by the implementation of the disclosure, and the receiving device 13 may have more or fewer components than the components shown, two or more components may be combined, or maybe implemented with different configurations of components.

It is understood that for the target implementation of the functional components included in the receiving device 13 in FIG. 13, reference may be made to the method implementations in FIG. 1 and FIG. 9, which will not be repeated here.

Those ordinary skilled in the art may realize that the modules and algorithm steps of each example described in combination with the implementations of the disclosure can be performed by electronic hardware, computer software, or a combination thereof. In order to clearly explain the interchangeability of hardware and software, the composition and steps of each example have been described generally in terms of functions in the above description. Whether these functions are performed in hardware or software depends on the specific application and design constraints of the technical solution. Professional technicians can use different methods to implement the described functions for each specific application, but such implementation should not be considered to be beyond the scope of the disclosure.

Those skilled in the art can clearly understand that, for the convenience and brevity of the description, the specific working processes of the devices and modules described above can refer to the corresponding processes in the foregoing implementations of method, and are not repeated here.

In the several implementations provided in the disclosure, it should be understood that the disclosed equipment, device, and method may be implemented in other ways. For example, to describe the composition and steps of each example. Whether these functions are executed in hardware or software depends on the specific application of the technical solution and design constraints. Professional technicians can use different methods to implement the described functions for each specific application, but such implementation should not be considered beyond the scope of this disclosure.

The implementations of device and equipment described above are only schematic. For example, the division of the modules is only a logical function division. In actual implementation, there may be another division manner. For example, multiple modules or components may be combined or integrated into another device, or some features can be ignored or not be implemented. In addition, the displayed or discussed mutual coupling or direct coupling or communication connection may be indirect coupling or communication connection via some interfaces, equipment, devices or modules, and may also be electrical, mechanical or other forms of connection.

The modules described as separate components may or may not be physically separated, and the components displayed as modules may or may not be physical modules, may be located in one place, or may be distributed on multiple network modules. Some or all of the modules may be selected according to actual needs to achieve the objects of the solutions in the implementations of the disclosure.

In addition, each functional module in each implementation of the disclosure may be integrated into one processing module, or each module may exist separately physically, or two or more modules may be integrated into one module. The above integrated modules may be implemented in the form of hardware or software functional modules.

When the integrated module is implemented in the form of a software functional module and sold or used as an independent product, it can be stored in a computer-readable storage medium. Based on this understanding, the technical solution of the disclosure essentially or a part that contributes to the existing technology, or all or part of the technical solution may be embodied in the form of a software product. The computer software product is stored in a storage medium which includes instructions to enable a computer device (which may be a personal computer, a server, or a network device, etc.) to perform all or part of the steps of the method described in the implementations of the disclosure. The foregoing storage media include: U-disks, mobile hard disks, read-only memory (ROM), random access memory (RAM), magnetic disks, or optical disks and other media that can store program codes.

The above is only a specific implementation of the disclosure, but the scope of protection of the disclosure is not limited to this. Any person skilled in the art can easily think of various equivalent modifications or replacements within the technical scope disclosed in the disclosure which should be covered by the protection scope of the disclosure. Therefore, the protection scope of the disclosure shall be subject to the protection scope of the claims.

What is claimed is:

1. A method for transmitting a control instruction, comprising:
    obtaining a first control instruction by a transmitting device via a first interface; encapsulating the first control instruction by the transmitting device into a first protocol data stream through a communication protocol;
    superimposing, by the transmitting device through a first coupling network, the first protocol data stream and a second protocol data stream, in the form of a differential signal, generated according to multimedia data to obtain a first signal, and transmitting, by the transmitting device, the first signal to a receiving device via a cable;
    filtering the first signal by the receiving device through a second coupling network to obtain a first target protocol data stream; and
    decapsulating the first target protocol data stream by the receiving device to obtain a first target instruction, wherein the first target instruction is used to control a first target device connected to a second interface of the receiving device.

2. The method according to claim 1, wherein obtaining the first control instruction by the transmitting device via the first interface comprises:
    obtaining the first control instruction from the first control device by the transmitting device via a first universal serial bus (USB) interface of the transmitting device; or
    encapsulating the first control instruction into the first protocol data stream by the transmitting device through a communication protocol comprises:
    encapsulating the first control instruction by the transmitting device through a USB protocol to obtain a first data, and
    encapsulating the first data by the transmitting device through the RS232 protocol to obtain the first protocol data stream with a transmission rate lower than a preset threshold; or
    encapsulating the first control instruction into the first protocol data stream by the transmitting device through a communication protocol comprises:
    encapsulating the first control instruction by the transmitting device through the USB protocol to obtain the first data, and
    encapsulating the first data by the transmitting device through a universal asynchronous receiver/transmitter (UART) protocol to obtain the first protocol data stream with a transmission rate lower than a preset threshold.

3. The method according to claim 1, further comprising:
    before superimposing, by the transmitting device through the first coupling network, the first protocol data stream and the second protocol data stream in the form of the differential signal, wherein the second protocol data stream is generated according to multimedia data,
    obtaining multimedia data, by the transmitting device, from a video source device via a high definition multimedia interface (HDMI); and
    compressing the multimedia data by the transmitting device through a compression algorithm to obtain compressed data, and encapsulating the compressed data to generate the second protocol data stream in the form of the differential signal.

4. The method according to claim 1, wherein
    when the transmitting device obtains the first control instruction via a first USB interface of the transmitting device,
    the first target instruction is used to control a first target device connected to a second interface of the receiving device, specifically:
    the first target instruction is used to control the first target device connected to a second USB interface of the receiving device.

5. A method for transmitting control instruction, comprising:
    obtaining a third control instruction by a receiving device via a third interface;
    encapsulating the third control instruction into a third protocol data stream by the receiving device through a communication protocol;
    superimposing, by the receiving device through a third coupling network, the third protocol data stream and a fourth protocol data stream in the form of a differential signal to obtain a third signal, and transmitting, by the receiving device, the third signal to a transmitting device via a cable;
    filtering the third signal by the transmitting device through a fourth coupling network to obtain a third target protocol data stream; and
    decapsulating the third target protocol data stream by the transmitting device to obtain a third target control instruction, where the third target control instruction is used to control the second target device connected to a fourth interface of the transmitting device.

6. The method according to claim 5, wherein:
    obtaining the third control instruction by the receiving device via the third interface comprises:
    obtaining the third control instruction by the receiving device from the second control device via a third universal serial bus (USB) interface; or
    encapsulating the third control instruction by the receiving device into the third protocol data stream through a communication protocol comprises:
    encapsulating the third control instruction by the receiving device through the USB protocol to obtain a third data, and
    encapsulating the third data by the receiving device through the RS232 protocol to obtain the third protocol data stream with a transmission rate lower than a preset threshold; or
    encapsulating the third control instruction by the receiving device through the USB protocol to obtain the third data, and
    encapsulating the third data by the receiving device through a universal asynchronous receiver/transmitter (UART) protocol to obtain the third protocol data stream with a transmission rate lower than a preset threshold.

7. The method according to claim 5, further comprising:
    before the receiving device superimposing the third protocol data stream and the fourth protocol data stream in the form of the differential signal through the third coupling network,
    receiving, by the receiving device, a target superimposed signal transmitted by the transmitting device; and
    filtering the target superimposed signal by the receiving device to obtain the fourth protocol data stream in the form of the differential signal.

8. The method according to claim 5, wherein
when obtaining the third control instruction by the receiving device via the third USB interface of the receiving device,
the third target control instruction is used to control the second target device connected to the fourth interface of a transmitting device, specifically,
the third target control instruction is used to control the second target device connected to the fourth USB interface of the transmitting device.

9. The method according to claim 5, wherein the receiving device comprises a first receiving device and a second receiving device, wherein
superimposing, by the receiving device through the third coupling network, the third protocol data stream and the fourth protocol data stream in the form of the differential signal to obtain the third signal, and transmitting, by the receiving device, the third signal to the transmitting device via the cable comprises:
superimposing, by the second receiving device through the third coupling network, the third protocol data stream and the fourth protocol data stream in the form of the differential signal to obtain the third signal, forwarding the third signal to the first receiving device via the cable, and transmitting, by the first receiving device, the third signal to the transmitting device.

10. A transmitting device, comprising:
a first memory configured to store an application program instruction and a first processor coupled to the first memory and configured to invoke the program instruction to:
obtain a first control instruction via a first interface;
encapsulate the first control instruction into a first protocol data stream through a communication protocol;
superimpose, through the first coupling network, the first protocol data stream and a second protocol data stream, in the form of a differential signal, generated according to multimedia data to obtain the first signal; and
transmit the first signal to a receiving device via a cable.

11. The transmitting device according to claim 10, wherein
the first processor configured to encapsulate the first control instruction into the first protocol data stream through a communication protocol is configured to:
encapsulate the first control instruction through a universal serial bus (USB) protocol to obtain first data, wherein the first control instruction is obtained, via a first USB interface of the transmitting device, from a first control device; and
encapsulate the first data through the RS232 protocol to obtain the first protocol data stream with a transmission rate lower than a preset threshold;
or,
encapsulate the first control instruction through the USB protocol to obtain the first data, and
encapsulate the first data through a universal asynchronous receiver/transmitter (UART) protocol to obtain the first protocol data stream with a transmission rate lower than a preset threshold.

12. The transmitting device according to claim 10, wherein the first processor is further configured to:
before superimposing, through the first coupling network, the first protocol data stream and the second protocol data stream in the form of the differential signal according to multimedia data,
obtain multimedia data from a video source device via a high definition multimedia interface (HDMI);
compress the multimedia data through a compression algorithm to obtain compressed data; and
encapsulate the compressed data to generate a second protocol data stream in the form of differential signal.

13. The transmitting device according to claim 10, wherein the first processor is further configured to:
filter the first signal transmitted by the receiving device through the second coupling network to obtain a first target protocol data stream;
and decapsulate the first target protocol data stream to obtain a first target control instruction, wherein the first target control instruction is used to control a first target device connected to a second interface of the transmitting device.

14. A receiving device, comprising:
a second memory configured to store an application program instruction and a second processor coupled to the second memory and configured to invoke the program instruction to:
obtain a third control instruction via a third interface;
encapsulate the third control instruction into a third protocol data stream through a communication protocol;
superimpose, through a third coupling network, the third protocol data stream and a fourth protocol data stream in the form of a differential signal to obtain a third signal; and
transmit the third signal to the transmitting device via a cable.

15. The receiving device according to claim 14, wherein the second processor configured to obtain the third control instruction via the third interface and encapsulate the third control instruction into the third protocol data stream through a communication protocol is configured to:
obtain the third control instruction via the third interface from the second control device via a third USB interface;
encapsulate the third control instruction through a universal serial bus (USB) protocol to obtain the third data, and
encapsulate the third data through a RS232 protocol to obtain the third protocol data stream with a transmission rate lower than a preset threshold; or,
obtain the third control instruction via the third interface from the second control device via a third USB interface;
encapsulate the third control instruction through the USB protocol to obtain the third data, and
encapsulate the third data through a universal asynchronous receiver/transmitter (UART) protocol to obtain the third protocol data stream with a transmission rate lower than a preset threshold.

16. The receiving device according to claim 14, wherein the second processor is further configured to:
before superimposing the third protocol data stream and the fourth protocol data stream in the differential signal format through the third coupling network, obtain a target superimposed signal transmitted by the transmitting device; and
filter the target superimposed signal to obtain the fourth protocol data stream in the form of the differential signal.

17. The receiving device according to claim 14, wherein the receiving device includes a first receiving device and a second receiving device,
wherein the receiving device configured to superimpose the third protocol data stream and the fourth protocol data stream in the form of the differential signal through the third coupling network to obtain the third signal, and transmit the third signal to the transmitting device via a cable is configured to:

superimpose, by the second receiving device, the third protocol data stream and the fourth protocol data stream in the form of the differential signal through the third coupling network to obtain the third signal, and forward, by the second receiving device, the third signal to the first receiving device via a cable, and transmit, by the first receiving device, the third signal to the transmitting device.

18. The receiving device according to claim 14, wherein the second processor is further configured to:

filter, through the fourth coupling network, the third signal transmitted by the transmitting device to obtain a third target protocol data stream; and decapsulate the third target protocol data stream to obtain a third target instruction, wherein the third target instruction is used to control the third target device connected to a fourth interface of the receiving device.

* * * * *